United States Patent [19]

Brogardh

[11] Patent Number: 4,531,230
[45] Date of Patent: Jul. 23, 1985

[54] OPTICAL DIGITIZER/POSITION MEASURING DEVICE

[75] Inventor: Torgny Brogårdh, Västerås, Sweden

[73] Assignee: Asea Aktiebolag, Västerås, Sweden

[21] Appl. No.: 388,439

[22] Filed: Jun. 14, 1982

[30] Foreign Application Priority Data

Jun. 16, 1981 [SE] Sweden ............................... 8103773

[51] Int. Cl.³ ............................................. G06K 9/20
[52] U.S. Cl. ....................................... 382/13; 178/18; 250/227; 250/557; 250/568; 382/44; 382/65
[58] Field of Search ................................ 250/555–559, 250/561, 566, 568, 571, 578, 208, 227, 231 SE; 178/18–20; 382/44, 48, 59–61, 13, 65; 356/375, 373; 340/347 P; 235/462–465, 469

[56] References Cited

U.S. PATENT DOCUMENTS

| | | | |
|---|---|---|---|
| 2,991,369 | 7/1961 | Grewe | 250/557 |
| 3,187,186 | 6/1965 | Martin | 250/231 |
| 3,546,671 | 3/1967 | Rogert et al. | 250/568 |
| 3,603,728 | 9/1971 | Arimura | 382/48 |
| 3,761,877 | 9/1973 | Fernald | 178/18 |
| 3,983,389 | 9/1976 | Cowardin et al. | 250/227 |
| 4,103,155 | 7/1978 | Clark | 250/231 |
| 4,254,331 | 3/1981 | Dorman et al. | 250/227 |
| 4,260,979 | 4/1981 | Smith | 382/59 |
| 4,302,109 | 11/1981 | Davies | 356/375 |
| 4,390,873 | 6/1983 | Kirsch | 178/18 |

FOREIGN PATENT DOCUMENTS

1930976 12/1970 Fed. Rep. of Germany ...... 250/557

OTHER PUBLICATIONS

Derwant's Abstract No. A9966B/05 SU 596,825, Feb. 13, 1978.

Primary Examiner—Leo H. Boudreau
Attorney, Agent, or Firm—Watson Cole Grindle & Watson

[57] ABSTRACT

The invention relates to an optical transducer for measuring position, angle, and the time dependence of these quantities in one, two or three dimensions, with at least one fiber optical transducer having light-emitting means which feeds incident light to an object on which the measurement is to be effected, a photo-detector which senses light emanating from the object after said incident light has been influenced by the object and an electronic unit partly for controlling the light-emitting means, and partly for evaluating the output of the photo-detector, the output signal being dependent on the variations in light transmission, light absorption, light reflection and/or photo-luminescence of a pattern on the object. The variations of one or more of the optical properties of the pattern in at least one direction have at least three different amplitude values which occur in a specific order, and that the relative amplitude values between variations of the optical properties, which variations are consecutive in space, are detected and evaluated by the electronic unit for determining the direction of movement and the position of the transducer relative to the object.

12 Claims, 28 Drawing Figures

OPTICAL DIGITIZER/POSITION MEASURING DEVICE

TECHNICAL FIELD

The present invention relates to an optical measuring system comprising a transducer and an object having a surface, the task of the measuring system being to measure position, angle, and the time dependence of these quantities in one, two or three dimensions between the tranducer and the surface, the measuring system comprising at least one light-emitting means which, via the transducer, is arranged to illuminate the surface, at least one photo-detector means which is arranged to sense light emanating from the light-emitting means after the light has been modified (e.g. reflected and/or transmitted) by the surface, and at least one electronic unit for switching in and out and controlling the light level of the light-emitting means and evaluating the signal variations from the photo-detector means, and where the surface is provided with an optically detectable pattern, defined by the variations of the light transmission, light absorption, light reflection and/or photo-luminescence of the surface. The control of the light-emitting means aims at stabilizing the light intensity, whereby high accuracy of measurement can be maintained, and time-division and frequency-division multiplexing of two or more light-emitting means can be performed.

Throughout this specification, references to "light" should be taken to include infra-red and ultra-violet radiations and not just electromagnetic radiation in the visible spectrum.

DISCUSSION OF PRIOR ART

U.S. patent application Ser. No. 319,649 (filed Nov. 9, 1981 in the names of Torgny Brogårdh and Christer Ovrén), now U.S. Pat. No. 4,475,240, discloses a fiber optical pen for feeding handwritten information into a computer. The described technique can also be applied, to some extent, for inputting graphic information provided that the demands for accuracy are not high. However, a problem still exists if such information is to be inputted when higher demands for accuracy are imposed.

The present invention relates to a transducer for reading in graphic information with very high accuracy. Thus, it presents a solution to the above-mentioned problem.

BRIEF STATEMENT OF INVENTION

According to the invention an optical measuring system is characterized in that the variations of one or more of the optical properties of the surface are arranged to have at least three different amplitudes in at least one direction across the surface, the amplitudes being defined by the difference between a local maximum and a local minimum of the light transmission, light absorption, light reflection or photo-luminescence of the pattern, the local minimum lying ahead of or after the maximum in the at least one direction, these different amplitudes being arranged always to occur in a given predetermined order (largest, mean, smallest amplitude, or largest, smallest, mean amplitude) in the direction, that the amplitudes, which are obtained when the transducer is displaced relative to the surface, are arranged, through the opto-electronic arrangement consisting of the light-emitting means, the transducer and the photo-detector means, to be transformed into electric signal amplitudes by the photo-detector means, which signal amplitudes are arranged to be evaluated by the electronic unit in order to determine the position, the angle and/or the direction of movement of the transducer relative to the surface of the object.

If the previously described fiber-optical pen is provided with an additional optical channel, a pen for simultaneous effective reading of handwritten and graphic information can be obtained.

The invention described in this specification permits the optical detection of an amplitude-coded bar pattern on the medium on which the graphic information is created or occurs. In order not to interfere with written lines, the coded bar pattern is suitably made sensitive in the infra-red region, whereby, for example, lines having a first IR absorption property in a first wavelength range are provided in the x-direction and lines having a differeent IR absorption property in a second wavelength range are provided in the y-direction. As a reference, the entire surface may be coated with a material having a third IR absorption property in a third wavelength range. To determine the direction of the written information, the absorption values are coded analogously in three levels, and to obtain absolute values of the position of the optical pen on the surface, either an additional coding is made of the relative absorption values of the absorption pattern, or separate absorption bands are used to give digital presentation of the situation.

Since the optical transducer provides an accurate position measuring device it can also be used for accurate position measurements, for example for the engineering industry.

BRIEF DESCRIPTION OF DRAWINGS

The invention will be exemplified in greater detail with reference to the accompanying drawings, in which.

DESCRIPTION OF SPECIFIC EMBODIMENTS

Figure 1:
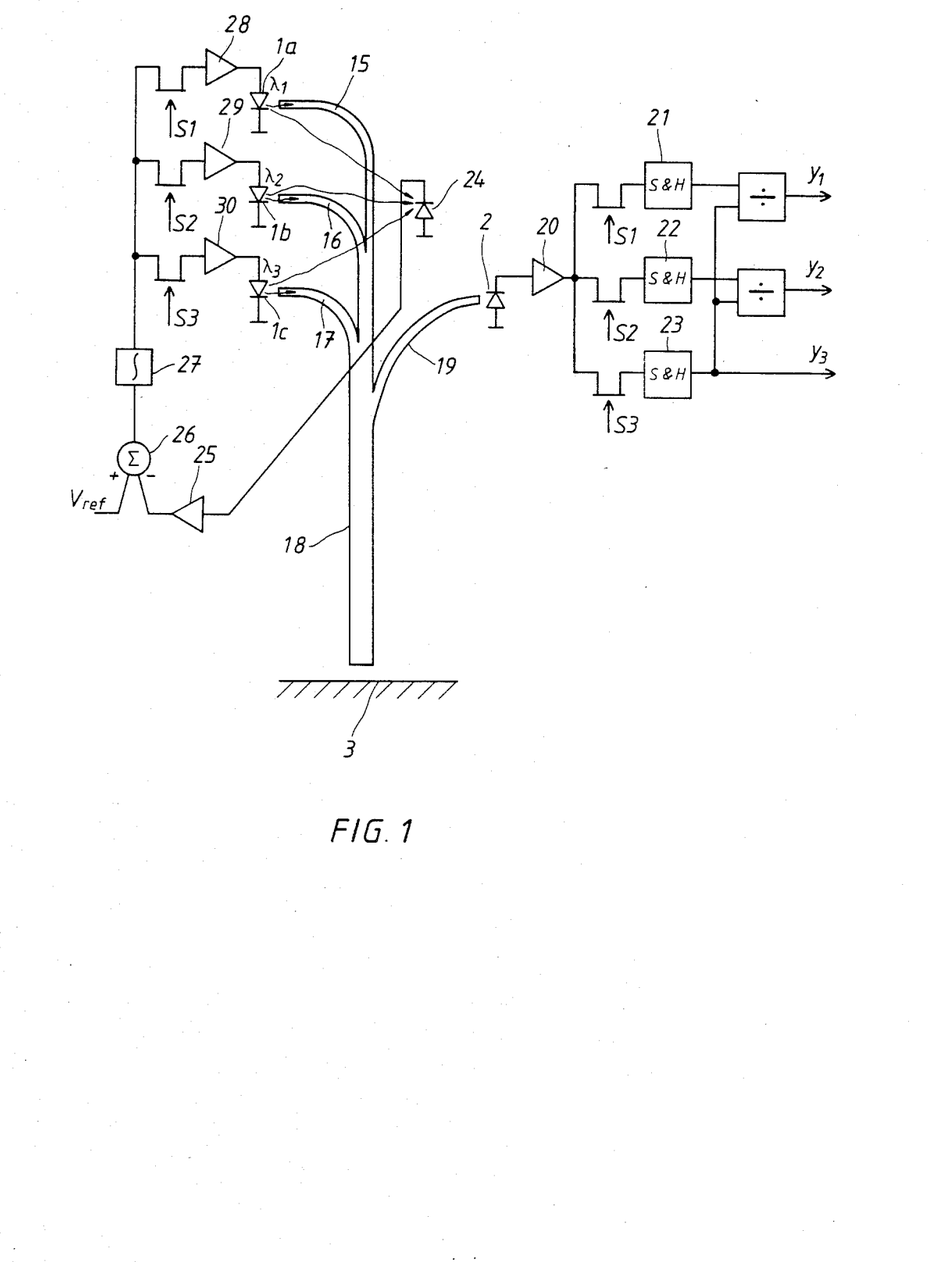
FIG. 1 is a schematic representation of the complete fiber optical system with its electronic units.

FIG. 1 shows an optical transducer with the fiber optical system proper and its associated electronic equipment. Three light-emitting means (LED's or laser diodes) 1a–1c illuminate, at different time intervals, via an optical fiber 18, a paper sheet 3 relative to which the position of the distal end of the fiber 18 in the x- and y-direction has to be measured. Light fibers 15, 16 and 17 are used to convey the incident light from the light-emitting means 1a–1c to the common light fiber 18 and from there onto the sheet 3. The light reflected back from the sheet 3 into the fiber 18 is led, via a fiber 19, to a photo-diode 2, which is coupled to an amplifier 20 and three sample-and-hold (S and H) circuits 21, 22 and 23. The light-emitting means 1a–1c emit light at three different wavelengths $\lambda_1$, $\lambda_2$ and $\lambda_3$, which have been selected in view of the pattern on the sheet 3 so that variations in the light absorption of the sheet in the x-direction are detected at the wavelength $\lambda_1$ and in the y-direction at the wavelength $\lambda_2$. The wavelength $\lambda_3$ functions as a reference, since the signals $y_1$ and $y_2$, which constitute measures of the absorption variations in the x- and y-direction, respectively, are formed by division by $y_3$. The signal $y_3$ thus constitutes a reference signal, which in principle is independent of where on the sheet 3 the measurement is performed. For stabilizing the light-emitting means, a light detector 24 is provided which supplies a control signal to a regulator consisting of an amplifier 25 and a summation device 26. A reference signal $V_{ref}$ is also fed to the device 26. The summator 26 feeds its output to a regulator 27 for controlling the energisation of the light-emitting means. The photo-detector 24 used to stabilize the light-emitting means is only necessary when the demands for measurement accuracy are high.

When there are lower demands for measurement accuracy, the absorption variations in the x- and y-direction can be measured directly, $\lambda_3$ may be omitted, and no quotient formations are then employed to obtain the signals $y_1$ and $y_2$. The supply circuits to the different light-emitting means comprise switches S1–S3 and amplifiers 28, 29, 30.

Figure 2A:
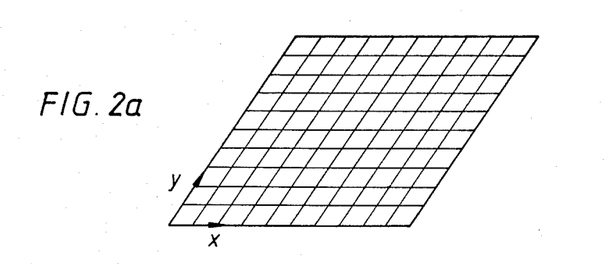
FIG. 2a shows the medium that is sensed by the system of FIG. 1.
Figures 2B, 2C:
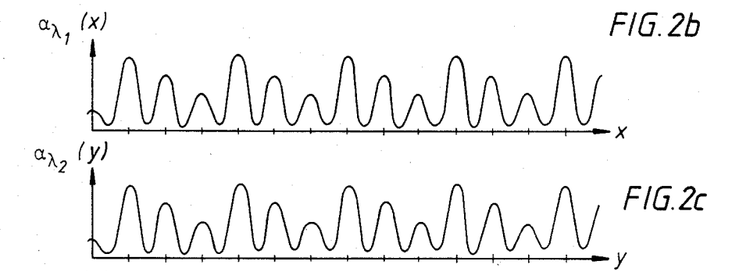
FIG. 2b shows the variations at the wavelength $\lambda_1$ of the light absorption of the medium of FIG. 2a in the x-direction.
FIG. 2c shows the variations at the wavelength $\lambda_2$ of the light absorption of the medium of FIG. 2a in the y-direction.
Figure 2D:
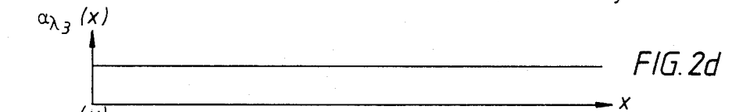
FIGS. 2d and 2e show the light absorption variations at the wavelength $\lambda_3$ of the medium of FIG. 2a in the x-direction and the y-direction, respectively.
Figure 2E:
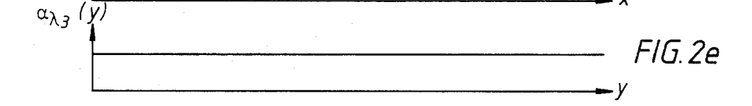
Figure 2F:
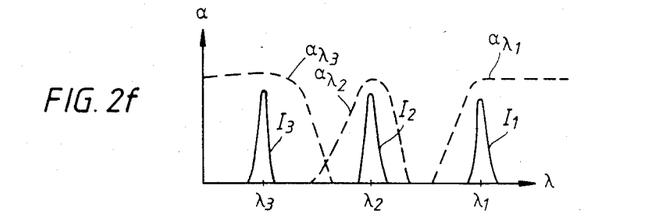
FIG. 2f shows the absorption spectra at the three wavelengths.

How the absorption variations can be assessed is illustrated in FIGS. 2a to 2f. FIG. 2a shows the sheet 3 which is sensed with the optical fiber 18 in FIG. 1; FIG. 2b shows the variations of the light absorption in the x-direction at the wavelength $\lambda_1$; FIG. 2c shows the variations of the light absorption in the y-direction at the wavelength $\lambda_2$; and FIGS. 2d and 2e show the variations in the x- and y-direction at the wavelength $\lambda_3$. This light absorption pattern can be obtained by forming a grid on the sheet 3 using marking materials having the absorption spectra shown by dash-line curves in FIG. 2f. The emission spectra $I_1$, $I_2$ and $I_3$ for the three light-emitting means 1a–1c are also shown in FIG. 2f.

The grid pattern can be created by lithography, photographic technique or offset printing, whereby a coating with the absorption specrum $\alpha_{80\ 3}$ is applied evenly across the whole sheet, material with the absorption spectrum $\alpha_{\lambda 1}$ is applied in vertical lines and material with the absorption spectrum $\alpha_{\lambda 2}$ is applied in horizontal lines as shown in FIG. 2a.

Figure 3A:
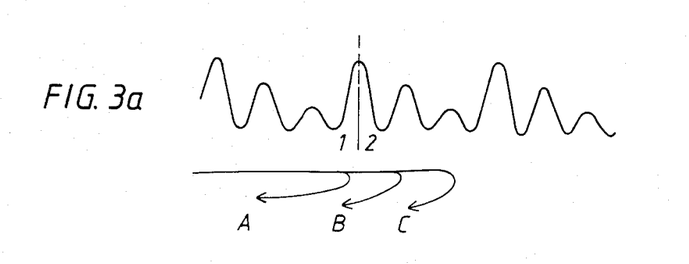
FIG. 3a shows the variations in light absorption scanned by three different movements A, B and C.
Figure 3B:
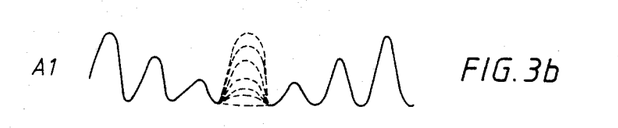
FIGS. 3b–3g show the measured absorption variations for six different cases, two for each of movements A, B and C.
Figure 3C:
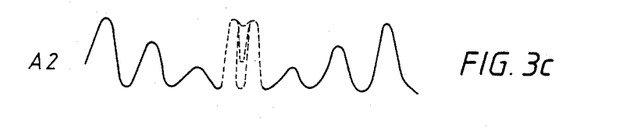
Figure 3D:
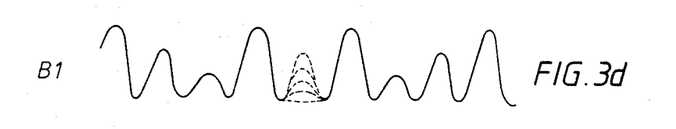
Figure 3E:
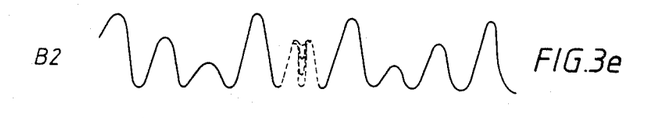
Figure 3F:
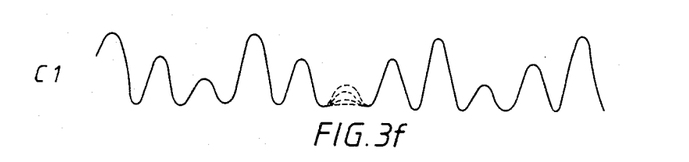
Figure 3G:
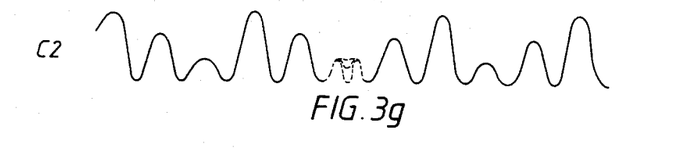
Figure 4A:
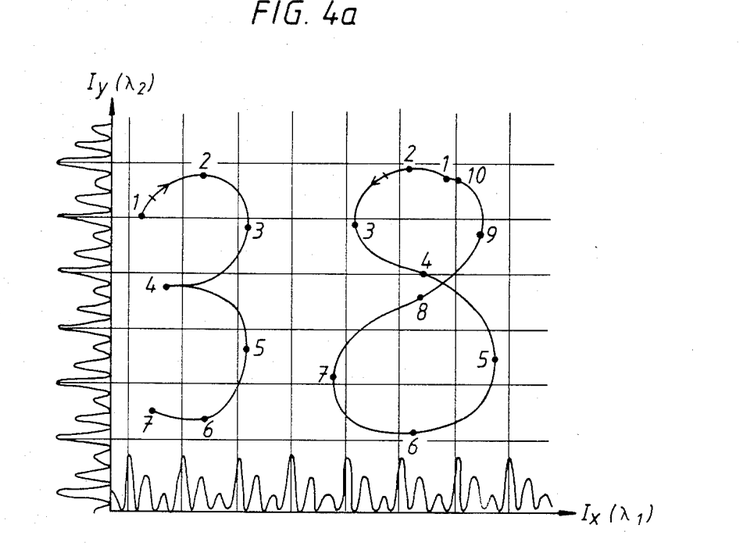
FIG. 4a shows two handwritten characters.
Figure 4B:
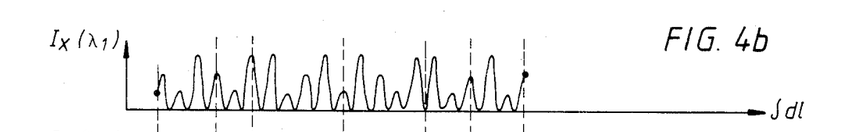
FIGS. 4b and 4c show the registered absorption variations in two directions for the first of the characters in FIG. 4a, FIGS. 4d and 4e show the same for the second of the characters in FIG. 4a, FIGS. 5a, 5b and 5c show three different methods of coding the absolute position of the fiber end.
Figure 4C:
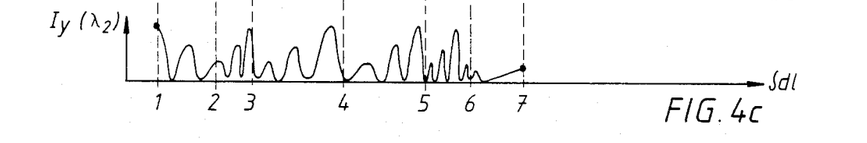
Figure 4D:
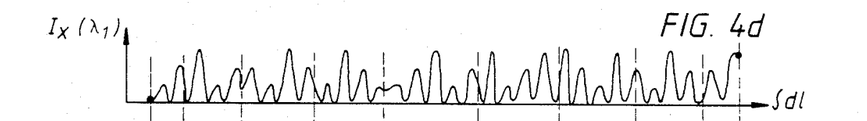
Figure 4E:
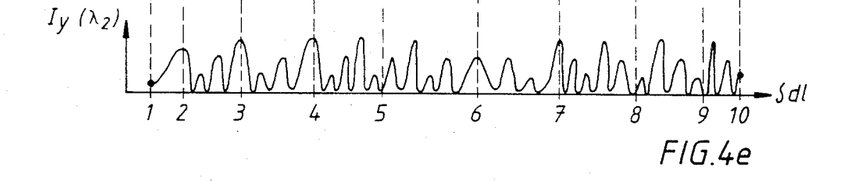

By making the adjacent lines in any given direction with three different concentrations of material in a specified order, the direction of movement of the fiber 18 across the sheet 3 can be determined. This is illustrated more clearly in FIGS. 3a to 3g. FIG. 3a shows the variations in light absorption along the path of the fiber end, A, B and C representing three fiber movements where the direction of movement is changed at different positions along the pattern of FIG. 3a. The measured absorption variations for the respective paths A, B and C are shown in FIGS. 3b–3g. For each path, two different outputs are given, FIGS. 3b, 3d and 3f representing a change in direction just prior to an absorption peak (e.g. on the side "1" of the broken line in FIG. 3a) and FIGS. 3c, 3e and 3g showing the output when the reversal of the direction of movement is after an absorption peak (e.g. on side "2" of the broken line in FIG. 3a). Thus, by analysing the output from the fiber 18 when it is moved over the sheet 3, it is possible to determine direction of movement and precisely when a movement direction is changed. This makes it possible, for example, to identify handwritten characters by measuring the absorption variations arising in the x- and y-directions, at the same time as the characters are written. This is illustrated in FIGS. 4a to 4e. In FIG. 4a the number "38" has been written on a sheet of paper having the absorption variations in x- and y-directions which are indicated along the x- and y-axes. FIG. 4b and FIG. 4c show the actual absorption variations Ix and Iy detected in tracing out the number "3" and FIGS. 4d and 4e show the same when tracing out the number "8". Specified locations on the characters are indicated by the dots (1, 2, 3, etc.) and these locations have also been indicated on the signals in FIGS. 4b to 4e.

Figure 5A:
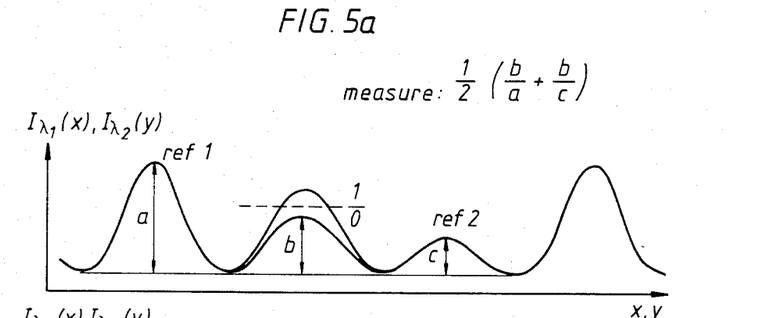
Figure 5B:
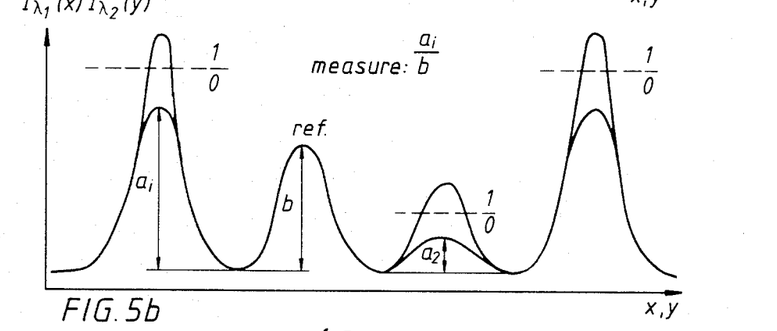
Figure 5C:
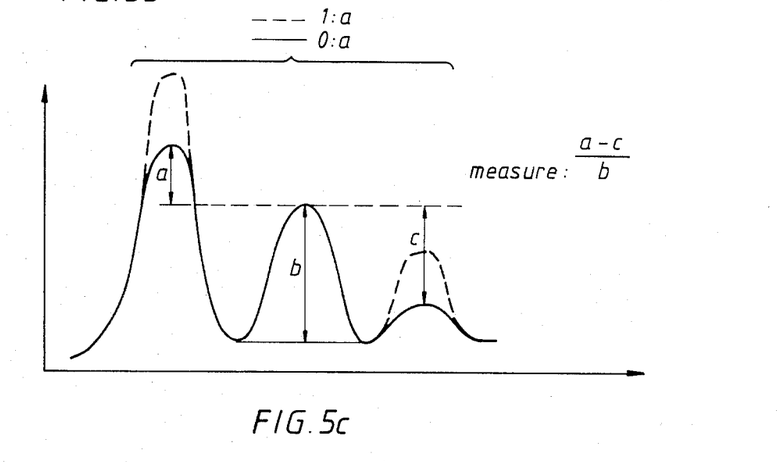

In principle, the described method of creating a pattern on a sheet of paper or the like and sensing this pattern optically at at least two wavelengths can be applied as a digitizer. In order to obtain the absolute position of the fiber end, in addition to a description of the movement of the fiber end, as shown in FIGS. 4a to 4e, the magnitude of the absorption variations can be coded, as shown in FIGS. 5a to 5c. If the amplitude b in FIG. 5a is greater than a certain value, this can be defined as a logic "1", and if b is smaller than this value, it can be defined as a logic "0". When, for example, the fiber has been moved a distance corresponding to twelve absorption variations in the x-direction, a signal in the form of a four bit information code is thus obtained, which specifies the absolute position of the fiber in the x-direction. To include more bits per length unit, two peaks may carry information and, for example, the amplitude b can function as a reference in the manner indicated in FIG. 5b. The possibility that combinations of the heights of the peaks relative to the height of a reference peak can be used to derive the coding is illustrated in FIG. 5c.

Figure 6:
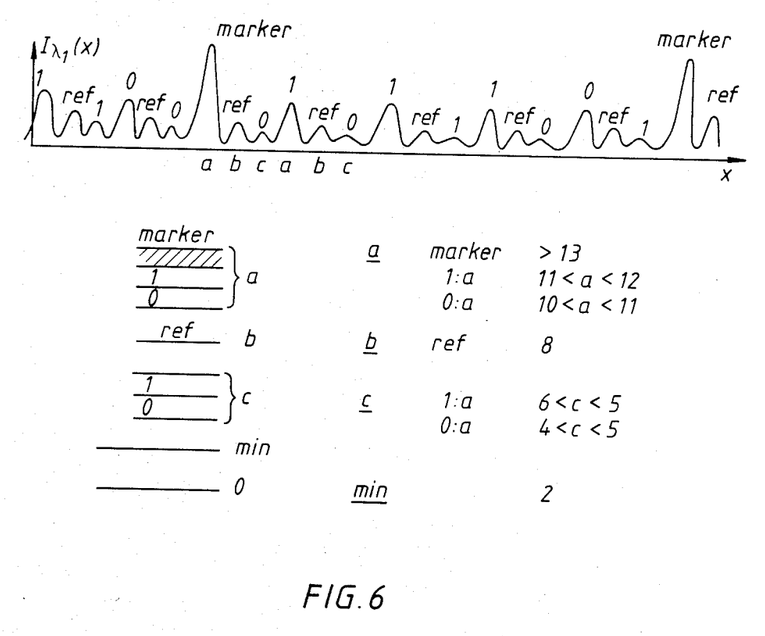
FIG. 6 shows a specific coding according to FIG. 5b, FIGS. 7a to 7c show the use of optical screen patterns for position or angle measurements.

The potential of this type of digital coding is illustrated in FIG. 6, which employs the coding method according to FIG. 5b but with the addition that the greatest maximum also constitutes a position marker if its value exceeds a certain level, which is higher than the value of a "1". With fifteen absorption variations, a nine-bit absolute position can be indicated, which, when adding the fourteen spacings between the markers, gives an absolute resolution of 7665 spacings. FIG. 6 also indicates an example of absorption levels corresponding to the boundaries between a marker peak and a "1" and between a "1" and a "0".

Figure 7A:
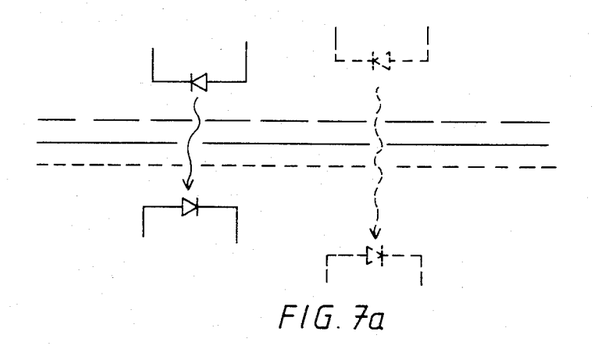
Figure 7B:
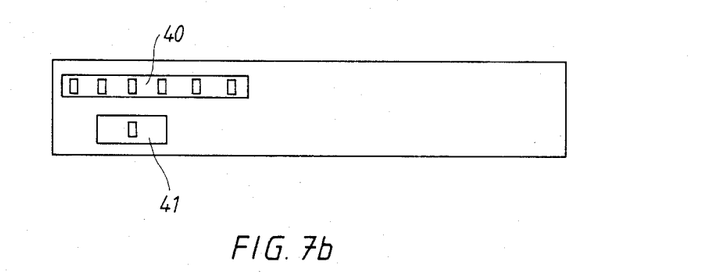
Figure 7C:
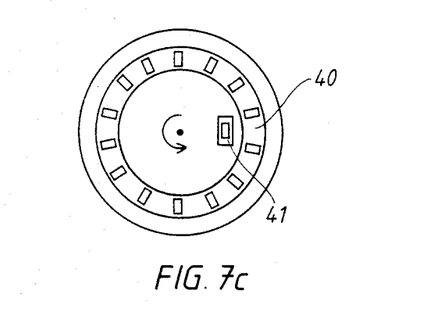

In addition to being used for digitizers, the method of the invention can be used for position and angle measurement according to FIGS. 7a-7c. In this case the relative movement of two screen patterns can be measured optically by transmission or reflection measurement. To obtain good accuracy when measuring the spacings of the absorption peaks (the "clock pulses"), this measurement can be performed by means of two screen patterns 40 and 41, thus obtaining a mean value formation. To determine an absolute reference position, only one slot (the "code reading" slot) 41 is used.

Figure 8:
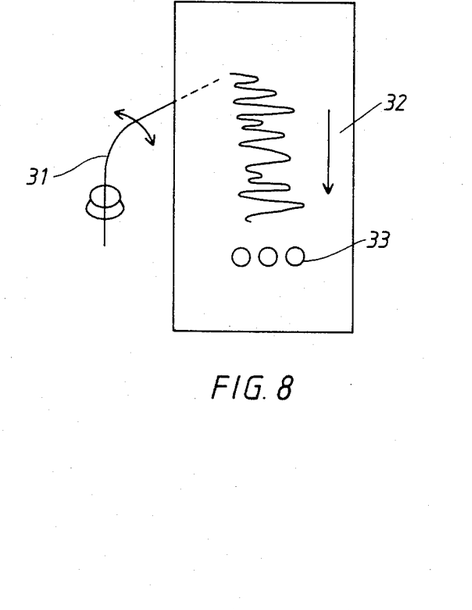
FIG. 8 shows pattern generation with an ink sprayer.

If the optical screen patterns according to FIGS. 7a-7c cannot be provided on a separate means mounted on the object being measured, the required pattern of absorption variations can be produced, for example, by spraying the absorptive material directly onto the object by means of an ink spraying technique somewhat as shown in FIG. 8.

FIG. 8 shows an ink sprayer 31 intended to provide markings on an object 32. The numeral 33 indicates three fiber detectors, and the device is thus intended for pattern generation with an ink sprayer. It is possible to use, for example, a luminescent material in the sprayer 31.

Figure 9:
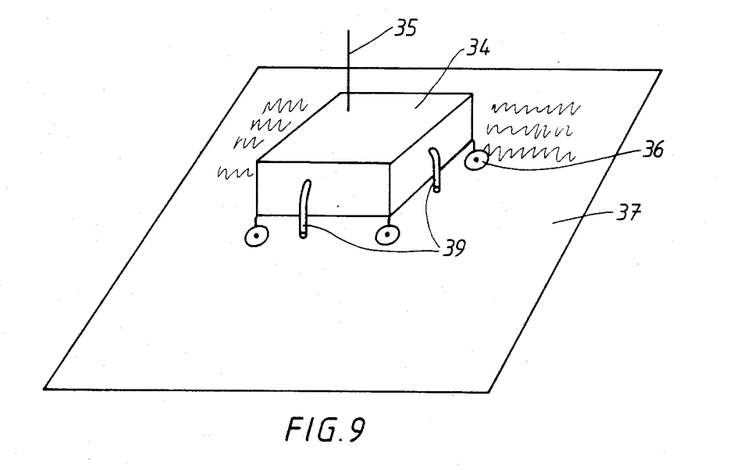
FIG. 9 shows a printer/plotter of mini-size.

The most important application of the invention is probably in the field of man/machine communication. In addition to providing a method for inputting handwritten symbols, sketches, figures and curves, the invention may be used for printer/plotter applications, where measurement of position for writing out is required. FIG. 9 shows a battery-powered carriage 34 with a marking means (not shown), rotatable wheels and fiber detectors. The numeral 35 designates an aerial and 36 designates the wheels provided with suitable means for their rotation and driving. 37 designates a sheet of paper with appropriate color coordinates and 39 designates the optical fibers used for position indication (cf. the fiber 18 in FIG. 1). Thus, FIG. 9 shows a printer/plotter of pocket size which is simply positioned on the paper where the writing-out is to take place. Since the paper 37 is provided with a grid pattern of the type described and since the carriage 34 has two optical fiber systems 39 for sensing the absolute position and orientation of the marking means of the carriage, the writing-out can be controlled to the desired position on the paper. In order that the writing-out shall not interfere with the grid pattern, the latter can be made to be sensitive in the infrared wavelength range.

The description given above provides examples of different embodiments within the scope of the following claims. It will be appreciated that many changes are possible within the spirit and scope of the invention.

What is claimed is:

1. An optical measuring system comprising at least one optical fiber transducer and an object having a surface, the measuring system being adapted to measure position, angle, and the time dependence of these quantities in at least one dimension between said transducer and said surface of the object, said measuring system further comprising at least one light-emitting means and said at least one optical fiber transducer to illuminate said surface, at least one photo-detector means to sense light from said light-emitting means emanating from said surface, and at least one electronic unit for controlling the light emitted by said light-emitting means and evaluating the signal variations from said photo-detector means, said surface being provided with an optically detectable pattern defined by variations of an optical property said variations of at least one of said optical properties of said surface are arranged to have at least three different amplitude values in at least one direction across said surface, said amplitude values being defined by the difference between a local maximum and a local minimum of said at least one optical property of said optically detectable pattern, said local minimum lying to one side of said local maximum in said at least one direction, said at least three different amplitude values are arranged to occur in a predetermined order in said at least one direction, said amplitude values, which are obtained when said at least one optical fiber transducer is displaced relative to said surface, are arranged, through the opto-electronic arrangement of said light-emitting means, said at least one optical fiber transducer and said photo-detector means, to be transformed into electric signal amplitudes by said photo-detector means, and said signal amplitudes being evaluated by said electronic unit to determine the position, the angle and/or the direction of movement of said at least one optical fiber transducer relative to said surface of the object.

2. An optical measuring system according to claim 1, in which said signal amplitudes are modulated in space to represent binary numbers and maintaining the detectability of the sequence of said signal amplitudes in space and thus the direction of movement of said at least one optical fiber transducer.

3. An optical measuring system according to claim 2, in which binary numbers of consecutive amplitude values are utilized for determining the absolute position of said at last one optical fiber transducer relative to said surface of the object.

4. An optical measuring system according to claim 3, in which an additional amplitude value is used for marking the absolute position represented in said binary numbers.

5. An optical measuring system according to claim 1, in which said optical properties vary within at least one wavelength range in one direction and within a second non-identical wavelength range in another, non-parallel direction, said light-emitting means emitting light in both wavelength ranges, said detector means receiving light in both wavelength ranges, and the detector signal variations in the two wavelength ranges being input to the electronic unit to determine the position of said at least one optical fiber transducer relative to said surface of the object in two dimensions.

6. An optical measuring system according to claim 5, in which light in a third different wavelength range is used for generating a reference signal, whereby the entire surface of the object is coated with an optical medium to generate across the entire surface a constant optical signal for compensation of instability in the optic system and variations in distance between the transducer and the object.

7. An optical measuring system according to any one of claims 1, 5 or 6, in which said at least three different amplitude values are arranged to be obtained by varying at least one of color strength and color spectrum when printing on cellulose or plastics material.

8. An optical measuring system according to any one of claims 1, 5 or 6, in which two of said fiber optical transducers are mounted on a printer, movable over said surface, for positioning the printer when marking a mark on said surface.

9. An optical measuring system according to any one of claims 1, 5 or 6, in which said at least one fiber optical transducer forms part of a pen for digitalizing graphic information marked on said surface.

10. An optical measuring system according to any one of claims 1, 2 or 3, in which said at least three different amplitude values are arranged to be generated by means of varying light properties in three different spectral bands and said varying optical properties at said different three spectral bands are respectively detected by means of at least three multiplexed light sources with different emission spectra, and each of these emission spectra respectively coincides at least partially with a different one of said spectral bands.

11. An optical measuring system according to claim 10, in which binary numbers are generated by the fact that said variations of at least one of said optical properties are binary-coded at a spectral band different from the spectral band(s) at which said direction of movement is determined, and at least one light-emitting means has an emission spectrum which at least partially coincides with said spectral band.

12. A method of optically sensing the movement of at least one fiber optical transducer means relative to a surface of an object in two non-parallel directions, comprising providing said surface with a pattern formed from discrete bands extending in each said direction and uniformly spaced apart in the other said direction, modifying incident light in a first wavelength range by the bands in one direction and modifying incident light in a second wavelength range by the bands in the other direction, modifying differently the incident light in the respective wavelength band by the adjacent bands in each said direction, receiving modified incident light from said bands in said at least one fiber optical transducer as the latter is moved over the surface, and determining from the received modified light in the respective two wavelength ranges the precise movement of said at least one optical transducer across the bands in the respective two directions.

* * * * *